Oct. 13, 1936.  W. H. WITHERS ET AL  2,057,354
INTERNAL COMBUSTION ENGINE AUTOMATIC VALVE CONTROL
Filed Nov. 4, 1935
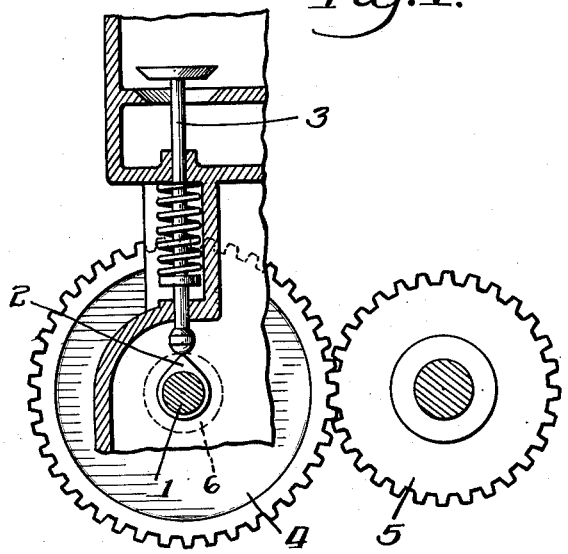
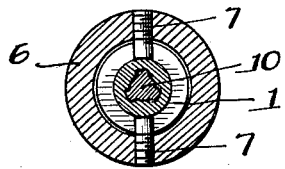
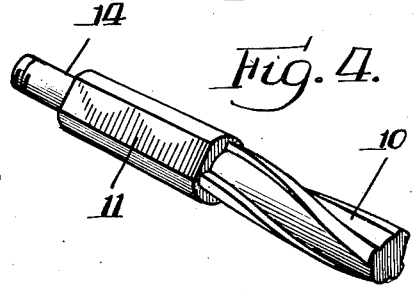
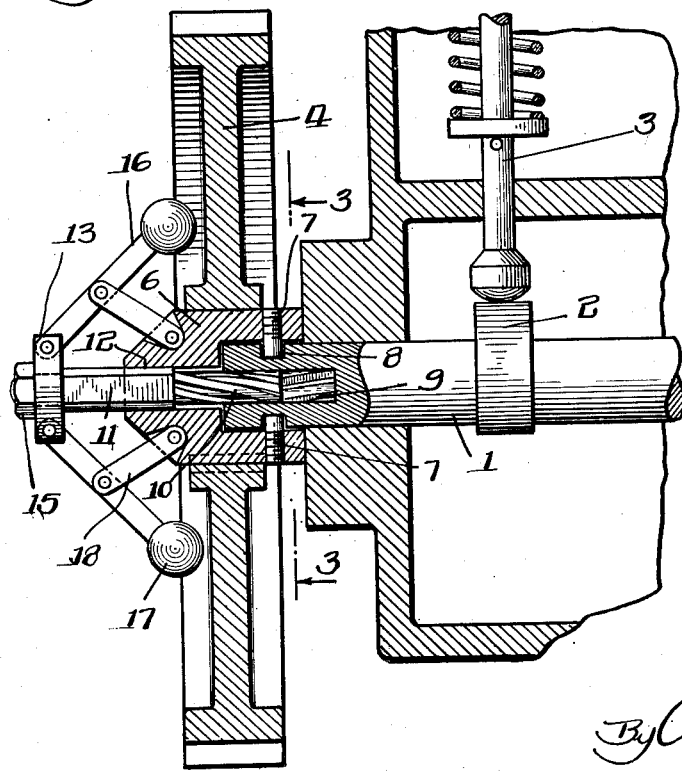
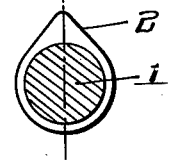
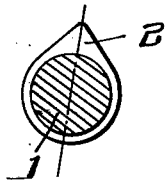
INVENTOR.
F. D. McVitty
W. H. Withers
By Arthur F. Durand
ATTORNEY.

Patented Oct. 13, 1936

2,057,354

UNITED STATES PATENT OFFICE 2,057,354

INTERNAL COMBUSTION ENGINE AUTOMATIC VALVE CONTROL

William Harold Withers and Frank Dewey McVitty, Modena, Utah

Application November 4, 1935, Serial No. 48,204

5 Claims. (Cl. 123—90)

This invention relates to automatic valve control, for internal combustion engines, for the purpose of insuring greater economy in the consumption of fuel.

Generally stated, the object of the invention is to provide a novel and improved construction and arrangement whereby a helical spline is advantageously employed for obtaining relative rotary adjustment between the cam shaft and the gear wheel, as the engine speeds up, thereby to advance the operation of the valves, thus insuring greater efficiency for the engine, and economy in the use of fuel.

It is also an object to provide certain details and features of construction tending to increase the general efficiency and desirability of an automatic valve control of this particular character.

To the foregoing and other useful ends, the invention consists in matters hereinafter set forth and claimed and shown in the accompanying drawing, in which—

Fig. 1 is a diagrammatic view showing the timing gears and the cam shaft and one of the valves of an internal combustion engine.

Fig. 2 is a longitudinal sectional view, on a larger scale, of a portion of the cam shaft, and of the gear wheel thereon, showing an automatic valve control embodying the principles of the invention.

Fig. 3 is a transverse section on line 3—3 in Fig. 2 of the drawing.

Fig. 4 is a perspective of the helical key connection between the cam shaft and the gear wheel.

Figs. 5 and 6 are diagrammatic views of one of the cams, showing the automatic control thereof.

As thus illustrated, referring to Fig. 1, the ordinary internal combustion engine has a cam shaft 1, upon which cams 2 are fixed for operating the valves 3, in the usual and well known manner, the gear wheel 4 on this shaft being operated by an ordinary pinion 5, in the usual manner. Ordinarily, these cams are set to provide the engine with what is called an economy range, say up to thirty-five miles an hour, and with a power range from there on to the maximum speed of the motor vehicle. The efficiency of the engine, for the power range, is well known to be much below that of the economy range, with the result that less mileage is obtained for the power range than for the economy range.

Therefore, to provide an economy range for practically the entire range of speed of the motor vehicle, the gear wheel 4 is provided with a hub 6 having pins 7 that engage the circumferential groove 8 on the shaft 1, previously mentioned. In order that the rotation of the gear wheel may drive the said shaft, the latter is provided with a helical socket 9 for engagement with the helical spline 10, that has a flattened portion 11 that is slidable endwise in a flattened bore 12 in the said hub, whereby the gear wheel 4 is in effect keyed to the shaft 1, for the purpose of rotating the cams 2 for operating the valves in the usual and well known manner. A loose collar 13 is held on the reduced end portion 14 of the flattened portion 11, by a nut 15, and this collar is provided with pivoted arms 16, provided with weights 17 at their distal ends. The arms 16 are connected by links 18 with the hub 6, as shown in Fig. 2 of the drawing.

With this construction, when the engine is started, and begins to speed up, the weights 17 will tend to move away from the axis of the shaft 1, and this will cause the helical spline 10 to move endwise into the socket 9, the latter having spiral threads, so to speak, on its interior, intermeshing with the spiral or helical threads on the key 10, whereby the shaft 1 will be turned slightly about its axis. For example, in Fig. 5, the cam is in the ordinary position, the normal position, but when the engine speeds up, the shaft 1 is turned slightly, as shown in Fig. 6, so that the cam 2 opens the valve sooner. As the engine attains to even higher speed, the relation between the shaft 1 and the gear wheel 4 is gradually changed, whereby, at higher speeds, the operation of the valves is advanced, and greater efficiency and economy are obtained in the operation of the motor vehicle. Ordinarily, there is a fixed relation between the shaft 1 and the gear wheel 4, in motor vehicles now in use, but with the helical spline connection between this shaft and the gear wheel, there is a gradual rotary relative adjustment between the shaft and the gear wheel, as the speed of the engine increases. Thus, automatic control is provided for the valves, in a manner to provide economy of fuel consumption for practically the entire speed range of the motor vehicle, for when the engine slows down, it is obvious that the weights 17 will move toward the axis of the cam shaft, thus restoring the cam shaft and the gear wheel to their normal relation to each other, so that the operation of the valves will be suitable for starting the engine.

To maintain said normal relation between the shaft 1 and the gear wheel 4, spring means can be provided, very obviously, as by providing a coil spring between the hub 6 and the sleeve 13, if such is found to be necessary or desirable, for when the engine begins to slow down, the helical key or spline 10 must move to the left to gradually restore the normal relation between the cam shaft and the gear wheel, and any suitable spring means can be employed for this purpose.

Thus it will be seen that both the shaft 1 and the gear wheel 4 are held against axial displacement, so that no relative displacement between the two is necessary in order to effect the relative adjustment of the cam shaft. It is also true, as will be seen from the drawing that the helical spline members 10 and 11 are of less diameter than the shaft 1, and that the latter has internal helical engagement with said member, whereby the threads or ridges of the latter do not extend completely around the memer, but each terminate at the end of the member before making the complete circumference of the member. In this way the spline is operated more easily, and there is less liability of axial displacement of the spline in the transmission of power from the gear wheel to the shaft. In other words, the proper keying action is obtained, whereby the shaft is positively driven by the gear wheel, but at the same time the helical formation is such that comparatively little power is necessary to move the helical member endwise to change the relation, rotatively, between the gear wheel and the shaft, thereby to automatically regulate the valve action.

With the construction shown and described, it will be seen that the invention can be applied to a cam shaft of standard size, as the helical spline does not require any enlargement of the shaft, for the purpose of the invention, inasmuch as such purpose is easily accomplished with a cam shaft of standard size, and hence the invention can not only be incorporated in new motor vehicles, at the factory, but can also be applied to a completed vehicle, as an attachment, by giving the cam shaft a helical bore, and by making certain other alterations.

What we claim as our invention is:

1. In an automatic valve control for internal combustion engines, in combination with the cam shaft and gear wheel thereof, both held against axial displacement, a helical spline connection between the gear wheel and the cam shaft, comprising an axially movable spline member of less diameter than the shaft, slidably connected to the gear wheel, and having helical engagement with said shaft, together with centrifugally operated means connected between said member and the gear wheel, for moving the spline member axially, thereby to cause relative rotation between the shaft and gear wheel, to change the timing of the action of the valves operated by the cam shaft.

2. A structure as specified in claim 1, said shaft having an axial socket formed to helically engage said member, and said shaft and gear wheel having pin and groove means preventing relative axial movement between them, while permitting said relative rotary motion.

3. A structure as specified in claim 1, said gear wheel having a hub in which a portion of said member is held against rotation relatively thereto, while permitting axial endwise movement therein.

4. A structure as specified in claim 1, said gear wheel having a hub in which a flattened portion of said member is held against rotation relatively thereto, while permitting axial endwise movement therein, and said centrifugal means comprising a loose collar on the outer end of said flattened portion, centrifugal weight arms pivoted on said collar, and pivoted links connecting said arms with said hub, whereby the movement of said arms under centrifugal force, as the speed of the engine increases, causes said member to move endwise relatively to the shaft and gear wheel.

5. A structure as specified in claim 1, said shaft having an axial bore of helical formation, to receive said member therein, and said member being keyed against rotation in the hub of said gear wheel, while having free endwise movement therein.

WILLIAM HAROLD WITHERS.
FRANK DEWEY McVITTY.